US011817680B2

(12) United States Patent
Seff et al.

(10) Patent No.: US 11,817,680 B2
(45) Date of Patent: Nov. 14, 2023

(54) POWER PEDESTALS WITH PER SIDE MAIN BREAKER DISCONNECTS

(71) Applicant: Eaton Intelligent Power Limited, Dublin (IE)

(72) Inventors: Paul D. Seff, Williamsburg, VA (US); Jason D. Easton, Williamsburg, VA (US); Andrew Van Fossen, Williamsburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 262 days.

(21) Appl. No.: 17/461,241

(22) Filed: Aug. 30, 2021

(65) Prior Publication Data

US 2023/0064105 A1  Mar. 2, 2023

(51) Int. Cl.
*H02B 1/50* (2006.01)
*B60L 53/16* (2019.01)
*B60L 53/31* (2019.01)
*H02G 3/04* (2006.01)

(52) U.S. Cl.
CPC .............. *H02B 1/50* (2013.01); *B60L 53/16* (2019.02); *B60L 53/31* (2019.02); *H02G 3/0493* (2013.01)

(58) Field of Classification Search
CPC ......... H02B 1/50; H02G 3/0493; B60L 53/16; B60L 53/31
See application file for complete search history.

(56) References Cited

U.S. PATENT DOCUMENTS

| | | | | |
|---|---|---|---|---|
| 4,307,436 A | * | 12/1981 | Eckart | H02B 1/50 361/823 |
| 4,785,376 A | * | 11/1988 | Dively | H02B 1/50 137/356 |
| 6,844,716 B1 | | 1/2005 | Lundberg et al. | |
| 8,089,747 B2 | | 1/2012 | Storck et al. | |
| 8,467,171 B2 | * | 6/2013 | Brown | H02B 1/52 116/99 |
| 10,158,221 B2 | * | 12/2018 | Seff | H02B 1/50 |
| 10,705,156 B1 | * | 7/2020 | Weeks | H05K 7/1427 |
| 2023/0011288 A1 | * | 1/2023 | Larsen | B60L 53/66 |

* cited by examiner

*Primary Examiner* — Zachary Pape
(74) *Attorney, Agent, or Firm* — Eckert Seamans Cherin & Mellott, LLC

(57) ABSTRACT

Power pedestals with individual per side ground fault mains allow for service of breakers and receptacles without interrupting power to adjacent in-use power circuits and or boaters. In turn, ground fault mains eliminate the need for individual ground fault breakers tied to each receptacle. The power pedestals also allow for use of reverse Y adapters in the vessel to pedestal connection and allow for serviceability of single side or whole pedestal without disconnecting power to a string of pedestals on a loop feed circuits and can reduce overall cost of maintenance by eliminating costly individual ground fault breakers per-shore power connection.

21 Claims, 16 Drawing Sheets

POWER PEDESTALS WITH PER SIDE MAIN BREAKER DISCONNECTS

FIELD OF THE INVENTION

The present invention relates to power pedestals and may be particularly suitable for marine or recreational vehicle power pedestals.

BACKGROUND

Power pedestals are typically free-standing outdoor electrical enclosures and are well known in the art. See, e.g., U.S. Pat. Nos. 8,089,747 and 6,844,716, the contents of which are hereby incorporated by reference as if recited in full herein. The power pedestals can provide a utility power distribution for certain target devices such as marine or recreational vehicles. Known power pedestals include one or more circuit breakers and power receptacles that can be used to provide power to the target devices. The power pedestals include one or more circuit interrupters such as ground fault circuit interrupters (GFCIs) that provide ground fault protection for the power outlet receptacles.

SUMMARY

Embodiments of the invention are directed to power pedestals that include a housing that has a first sidewall with externally accessible first and second power outlet receptacles and a second sidewall with externally accessible third and fourth power outlet receptacles. The power pedestals also include a power circuit in the housing coupled to an incoming bus. The power circuit has a first ground fault circuit breaker coupled to first and second branch circuit breakers and a second ground fault circuit breaker coupled to third and fourth branch circuit breakers. The first and second branch circuit breakers are coupled to the first and second power outlet receptacles, respectively, and the third and fourth branch circuit breakers are coupled to the third and fourth power outlet receptacles, respectively. The first, second, third and fourth branch circuit breakers are non-ground fault circuit breakers whereby the first, second, third, and fourth power outlet receptacles are free of connections to respective individual ground fault breakers.

The power circuit can have a first side and a second side that are each electrically connected to a first lead, a second lead, electrical ground and electrical neutral of the incoming bus. The first side includes the first ground fault circuit breaker and the first and second branch circuit breakers and the second side includes the second ground fault circuit breaker and the third and fourth branch circuit breakers.

The power pedestal can be configured so that only one of the first side or the second side of the power circuit further has a photocell and a light source coupled to the first lead.

The power pedestal can be configured so that only one of the first side or the second side of the power circuit has a photocell and a light source and also has a fuse coupled to the first lead and the photocell.

The first, second, third and fourth power outlet receptacles can be marine grade, corrosion resistant receptacles.

The first and second ground fault circuit breakers can be two-phase, 30 mA ground fault protected devices.

The first, second, third and fourth branch circuit breakers can be two phase, 50 A (amp) devices.

The first, second, third and fourth power outlet receptacles can be 50 A, 125/250V power outlet receptacles.

The first, second power outlet receptacles can be configured to connect to first and second plugs of a reverse Y adapter in a vessel to power pedestal connection.

The power pedestal can be provided in combination with a power distribution cabinet with a feeder breaker connected to the power pedestal and to a plurality of additional power pedestals defining a power pedestal loop feed bus. The power circuit of each power pedestal can be configured to provide an electrical disconnect from the loop feed bus allowing for serviceability of the first side or the second side of the power circuit or an entirety of the power pedestal without disconnecting power to a string of pedestals on the loop feed bus.

The power pedestal can have an internal bus electrically connected to the incoming bus and to the first, second, third and fourth power outlet receptacles providing the power circuit.

The internal bus can reside inside the housing above the incoming bus.

The power pedestal can also include a water supply connection coupled to the housing.

The housing can have a third sidewall connecting the first and second sidewalls. The third sidewall can have a removable panel or a pivotable panel. The third sidewall can optionally have a visually transmissive window.

The power pedestal can also include a first ground fault indicator and reset and externally accessible and adjacent the first ground fault circuit breaker on the first sidewall and a second ground fault indicator and reset externally accessible and adjacent the second ground fault circuit breaker on the second sidewall.

Other embodiments are directed to methods of providing ground fault protection to power pedestals. The methods include providing a plurality of power pedestals, each with a power circuit in a power pedestal housing and coupled to an incoming bus. The power circuit includes a first ground fault circuit breaker coupled to first and second branch circuit breakers and a second ground fault circuit breaker coupled to third and fourth branch circuit breakers. The first and second branch circuit breakers are coupled to first and second power outlet receptacles, respectively. The third and fourth branch circuit breakers are coupled to third and fourth power outlet receptacles, respectively. The first, second, third and fourth branch circuit breakers are non-ground fault circuit breakers thereby eliminating individual ground fault breakers tied to each power outlet receptacle. The methods further include: electrically disconnecting the first ground fault circuit breaker from the power circuit and while keeping the second ground fault circuit breaker operational and with the power circuit providing power to the third and fourth power outlet receptacles but not the first and second power outlet receptacles; and servicing power circuit components of the power pedestal while the third and fourth power outlet receptacles are supplying power and the first and second power outlet receptacles are not supplying power without requiring a power down of an entirety of the power circuit.

The power circuit can have a first side and a second side that are each electrically connected to a first lead, a second lead, electrical ground and electrical neutral of the incoming bus. The first side can include the first ground fault circuit breaker and the first and second branch circuit breakers and the second side can include the second ground fault circuit breaker and the third and fourth branch circuit breakers.

The power pedestals can be provided so that only one of the first side or the second side of the power circuit further has a photocell and a light source coupled to the first lead.

The method can further include detecting environmental lighting conditions using the photocell and illuminating the power pedestal using the light source.

The first, second, third and fourth power outlet receptacles can be marine grade, corrosion resistant receptacles.

The method can further include connecting a reverse Y adapter cable from a vessel to a power pedestal of the plurality of power pedestals for shore power.

The power pedestal can be one of a plurality of power pedestals connected to a common feeder breaker of a power distribution cabinet and defining a power pedestal loop feed bus. The method can further include allowing each power pedestal to provide an electrical disconnect from the loop feed bus allowing for serviceability of the first side or the second side of the power circuit or an entirety of the power pedestal without disconnecting power to a string of pedestals on the loop feed bus thereby allowing for serviceability of the first side or the second side of the power circuit or the entire power pedestal without disconnecting power to a string of the plurality of power pedestals on a loop feed circuit.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Figure 1:
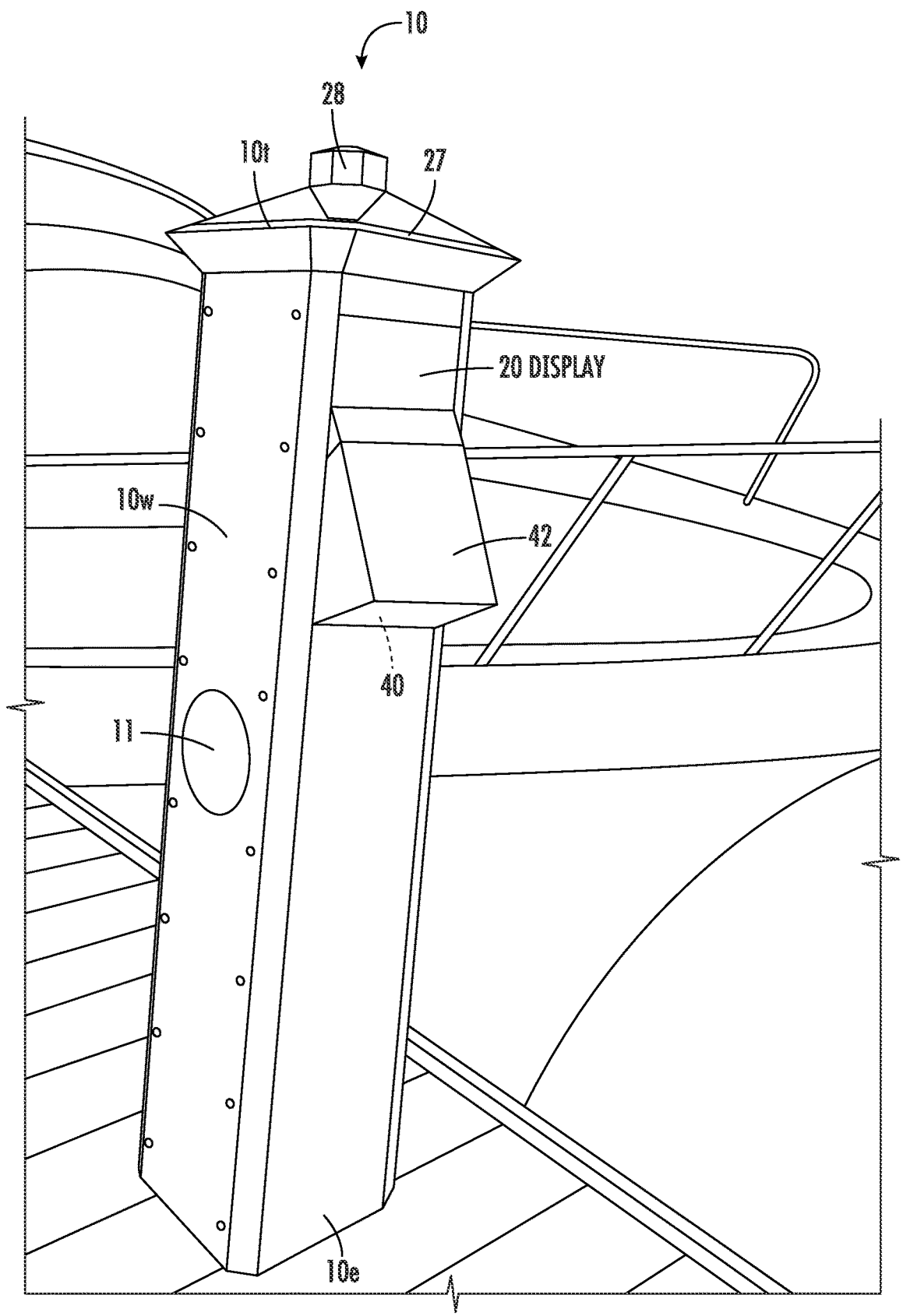
FIG. 1 is a side perspective view of an example power pedestal according to embodiments of the present invention.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10''').

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly. The term "about" refers to numbers in a range of +/−20% of the noted value. Any numerical range stated to be between two numbers is inclusive of the end point numbers.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As employed herein, the term "vehicle" shall expressly include, but not be limited by, a land vehicle, a marine vehicle, an air vehicle or another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, mopeds, campers and trailers.

As employed herein, the term "marine vehicle" shall expressly include, but not be limited by, any water-based vehicles, ships, boats, personal watercraft or other vessels for travel on water, submarines, or other vessels for travel under water.

As employed herein, the term "air vehicle" shall expressly include, but not be limited by, any air-based vehicles, airplanes, jets, aircraft, airships, drones, balloons, blimps, or dirigibles.

As employed herein, the term "power pedestal" shall mean a pedestal structured to input power from input power terminals (e.g., utility power terminals) and output power to a number of output power receptacles held by the power pedestal.

The term "APP" refers to a computer program configured to provide defined functionality on a computer including pervasive computing devices and/or mobile devices such as an electronic notebook or notepad, smart phone, laptop, and the like. In some embodiments, the functionality of the APP may be accessible via an icon on a display of the computer and/or may be accessed by other user input, such as input provided by a typed or spoken user interface of the computer. The computer program may comprise computer program code configured to reside in a memory of the computer to be accessed and executed by a processor or other computing circuit of the computer, but the embodiments of the invention are not limited thereto. In some embodiments, the computer program code, processor, and/or memory may be located remotely from the computer providing the functionality, such as in a networked environment, or "cloud."

As employed herein, the term "processor" shall mean a programmable analog and/or digital device that can store, retrieve, and process data; a computer; a workstation; a personal computer; a digital signal processor (DSP); a microprocessor; a microcontroller; a microcomputer; a central processing unit; a mainframe computer; a mini-computer; a server; a networked processor; a programmable logic device (PLD); a combination of a plurality of logic gates; or any suitable processing device or apparatus.

Figure 2:
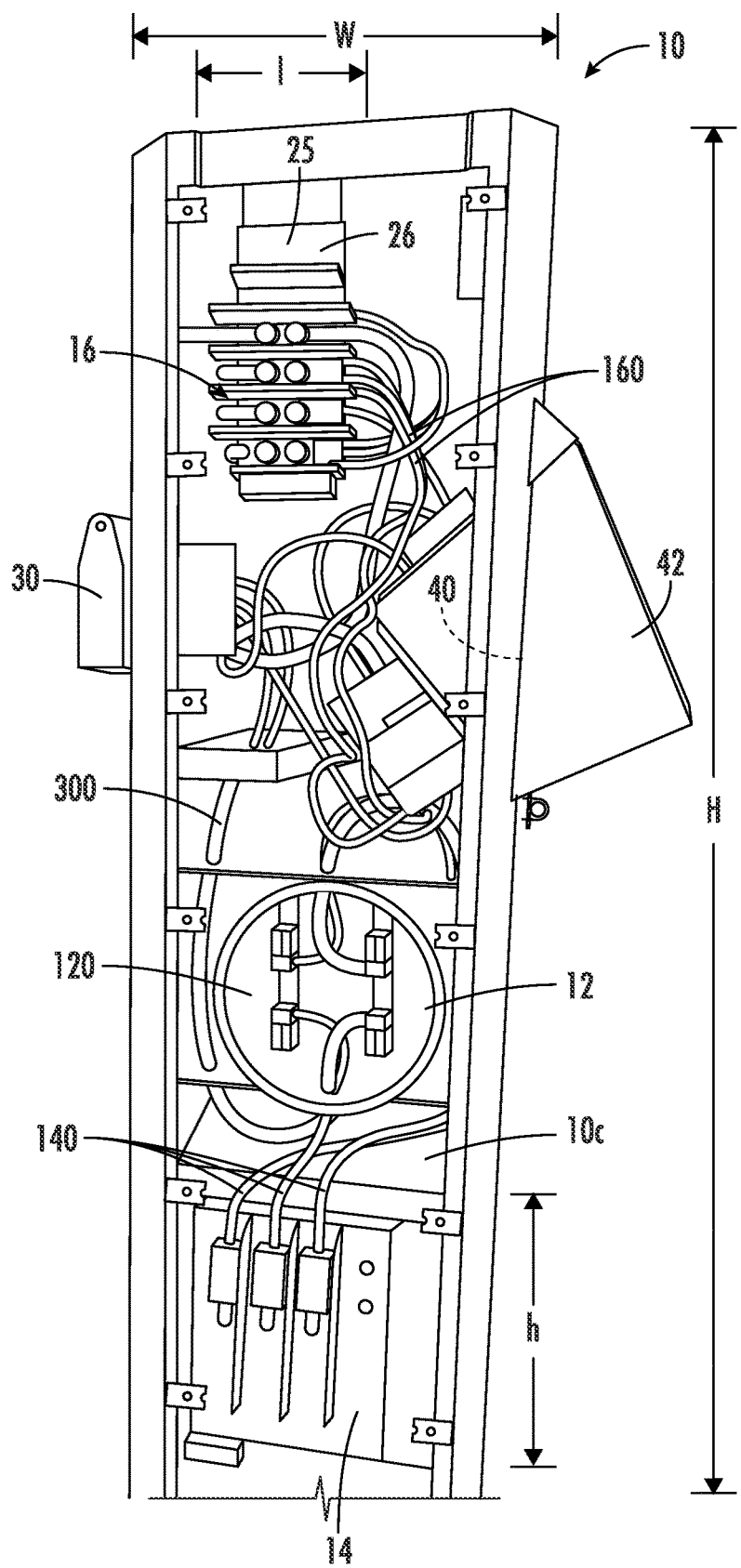
FIG. 2 is a side view of the power pedestal shown in FIG. 1, illustrated with one wall panel removed according to embodiments of the present invention.

Referring to FIGS. 1 and 2, a power pedestal 10 such as, for example and without limitation, a marine and/or vehicle power pedestal, with an enclosure 10e for certain electrical components of the power pedestal 10 is shown. The enclosure 10e can include an outer wall 10w that faces a meter socket 12. The meter socket 12 is held inside the enclosure 10e. The term "meter socket" is well known to those of skill in the art and refers to a metering assembly 120 with such meter socket 12 that meters power usage. The meter socket 12 can have a circular outer perimeter.

The power pedestal 10 can include a display 20 that is externally viewable. The power pedestal 10 can also include a light source 27 such as an LED illumination light and a photocell 28. The light source 27 and the photocell 28 may reside at a top portion 10t of the power pedestal 10.

The incoming bus 14 can be oriented to direct the electrical lines 140 to be routed upward toward the meter socket 12. The internal bus 16 can be oriented to direct the electrical lines 160 to extend downward toward the one or more power outlet receptacles 40 and the one or more circuit breakers 30.

Referring to FIG. 2, the internal bus 16 can extend horizontally across a sub-width of the chamber 10c of the enclosure 10e. The incoming bus 14 can extend vertically under the meter socket 12. The incoming bus 14 can have a height dimension H that is greater than a transverse length dimension I of the internal bus 16. The meter socket 12 can occupy a major portion of a width of the chamber 10c. The power pedestal can have a height dimension H that is greater than a width and/or depth dimension to provide a relatively small external footprint. In some embodiments, the width dimensions W of each side are all in a range of 8-12 inches, such as in a range of 9-10 inches while the height dimension H is 4-8 times greater than a largest of the width dimensions W.

The wall 10w can include a window 11 that is aligned with the internal meter socket 12 that allows a user to be able to see the meter socket 12. The window 11 can comprise a visually transmissive material such as a translucent or transparent material. The window 11 can comprise plexiglass.

The window 11 is shown as circular but can be any desired shape allow for viewing of the internal meter socket/assembly 12/120.

Still referring to FIG. 2, the power pedestal 10 can comprise a transceiver 25 that can communicate with at least one external device such as a remote monitoring/control system 100 and one or more mobile devices 110. The transceiver 25 can be coupled to the meter assembly 120 comprising the meter socket 12 and can be configured to allow for control of power output from or provided to a respective power pedestal 10 and local or remote wireless communication allowing for wireless metering.

Figure 4A:
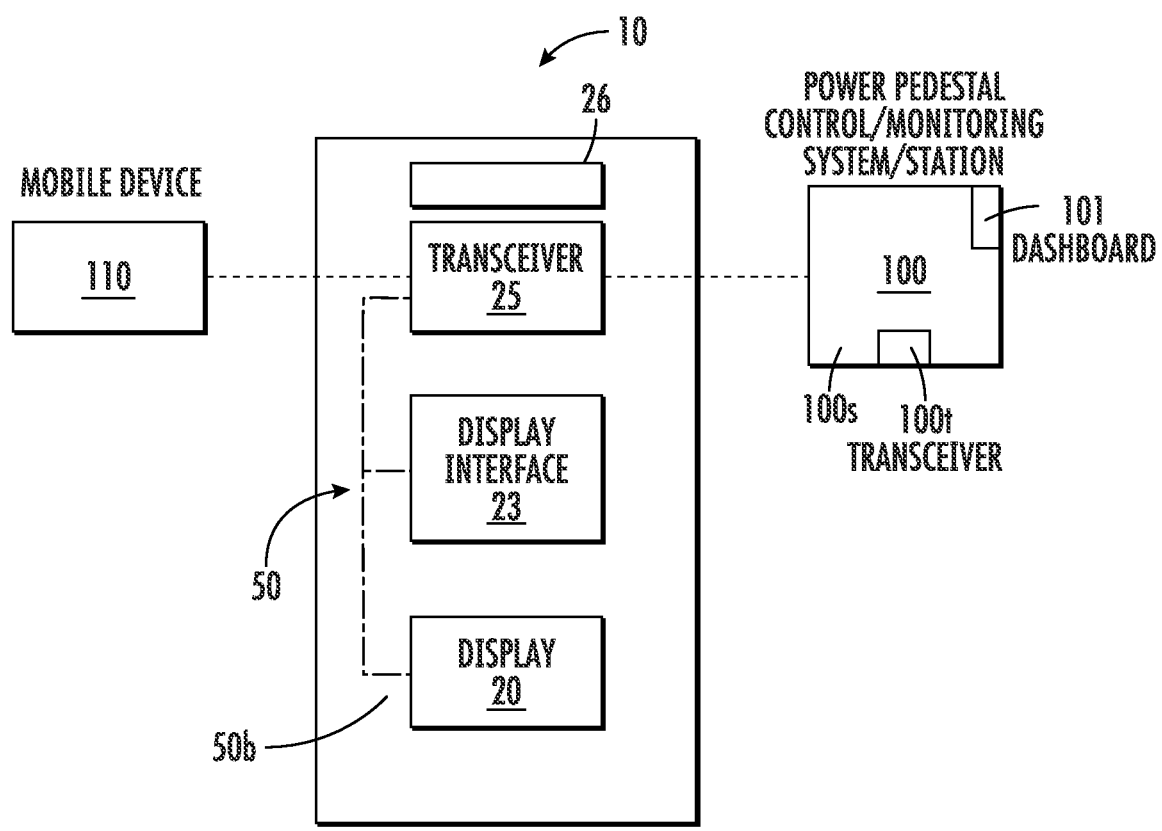
FIG. 4A is a schematic illustration of a power pedestal with example internal components according to embodiments of the present invention.

The transceiver 25 can be configured to receive/accept user input. The transceiver 25 can comprise or be coupled to a processor 26. The transceiver 25 can be configured to transmit data from a respective power pedestal 10 to one or more external devices, shown as devices 100, 110 (FIG. 4A). The transceiver 25 can be configured to transmit current user information associated with a respective power pedestal 10.

The display 20 can be configured to have or be in communication with a programmable interface 23 that allows different marinas/RV parks and the like to customize and select or define input parameters and output parameters to facilitate communication to (marina) tenants. The display 20 can be in communication with the transceiver 25. The display 20 can be configured to display information such as reminders on arrival date, departure schedule, payments due, power usage and the like. The display 20 can be configured to display a slip number/slot or lot number/location, vehicle name, vehicle ownership, tag number, country registration data and the like as well as meteorological data, metering information, and power pedestal status (reserved, active ON, Offline for repair/service and the like). The display 20 can be configured to provide advertising and/or data on local attractions and eateries. The display 20 can be configured to display ground fault data of a power circuit 300 connecting one or more circuit interrupters 30 to one or more power outlet receptacles 40 of the power pedestal 10.

The power pedestal 10 can include a power circuit 300 comprising at least one circuit interrupter 30 (e.g., circuit breaker) and an incoming bus 14 with electrical lines 140 coupled to the meter socket 12. The power circuit 300 can also be configured with an internal bus 16. The internal bus 16 can include electrical lines 160 that are coupled to one or more respective circuit breakers 30 and/or one or more respective power outlet receptacles 40. The meter socket 12 can also be coupled to the internal bus 16. The internal bus 16 can reside above the incoming bus 14. As will be discussed further below, the one or more circuit breakers 30 can include at least one primary or main circuit breaker 30, configured as a GFCI or GFCI/AFCI, that can be coupled to at least one branch circuit breaker 130 (FIG. 6), that is, in turn, coupled to a respective power receptacle 40. In doing so, the power pedestal 10 can provide GFPE or GFCI protection to all shore power receptacles 40 on a given side of the pedestal rather than providing individual GFCI/GFPE breakers 130 for each receptacle 40.

Conventionally, meter sockets are located outside of the enclosure 10e. The internal meter socket 12/meter assembly 120 allows for protection from environmental conditions, tampering and vandalism.

Figure 3A:
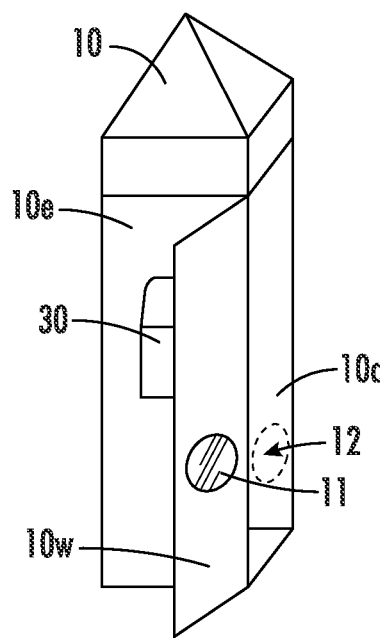
FIG. 3A is a side perspective view of a power pedestal illustrating a pivotable wall panel according to embodiments of the present invention.
Figure 3B:
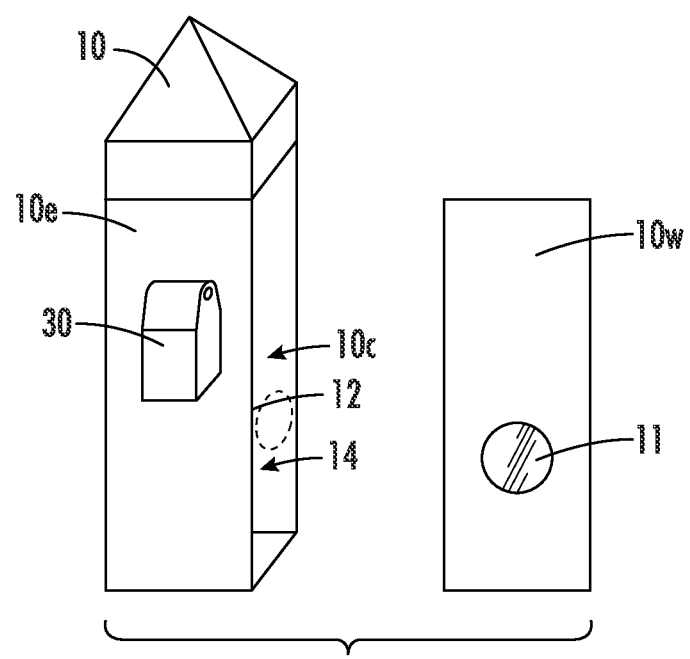
FIG. 3B is a side perspective view of a power pedestal illustrating a detachable/removable wall panel according to embodiments of the present invention.

Also, and advantageously, unlike power pedestals 10 with external meter sockets, to service the power pedestal 10, there is no requirement to pull out lengths of electrical cables 140, 160 to access internal components. Instead, the cables 140, 160 can remain in position in the chamber 10c inside the enclosure 10e and access to the meter assembly 120 can be provided by pivoting the panel 10w to an open position (FIG. 3A) or by removing the panel 10w (FIG. 3B).

The power pedestal 10 can include the internal meter socket 12, the transceiver 25 and the display 20, the internal bus 16 and the incoming bus 14 (ready for customer installation thereto) and can be factory wired as a complete system that complies with UL231 listed marina power pedestal standards.

Referring to FIG. 4A, the power pedestal 10 can comprise an internal circuit 50 that couples the transceiver 25 to a display interface 23 and display 20. The transceiver 25 can communicate with the mobile device 110 and control/monitoring system 100 which may be provided as a workstation 100s and/or a dashboard 101 on a computer(s) or mobile device 110. The system 100 can include a transceiver 100t that communicates with a plurality of power pedestals 10.

Figure 4B:
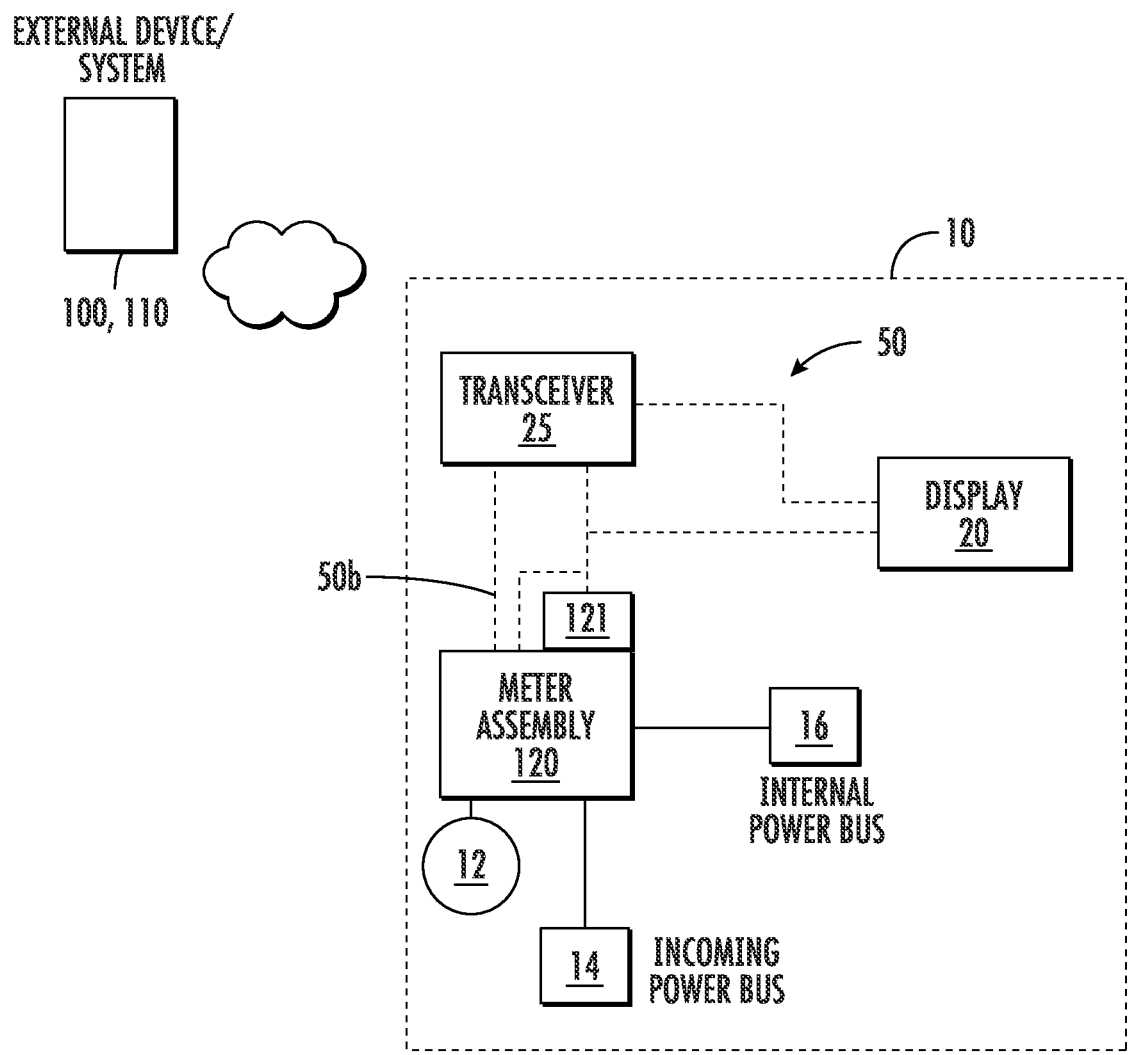
FIG. 4B is another schematic illustration of a power pedestal with example internal components according to embodiments of the present invention.

Referring to FIG. 4B, the power pedestal 10 can comprise an internal circuit 50 that couples the transceiver 25 to the meter assembly 120 comprising the meter socket 12, and to the display 20. The internal circuit 50 can be configured to allow the transceiver to wirelessly communicate with the meter assembly 120, optionally via another (second) transceiver 121 coupled to the metering assembly 120. The internal circuit 50 can also couple the incoming and internal power buses 14, 16, respectively via the metering assembly 120.

FIG. 4B illustrates that the first transceiver 25 and the second transceiver 121 can each be configured to wirelessly communicate with a respective mobile device 110 and/or remote control/monitoring system and/or station 100.

The internal circuit 50 can include a communications bus 50b that can comprise a Modbus® configuration or other communications bus configuration.

Referring again to FIGS. 1 and 2, the power pedestal 10 can also include a plurality of power (outlet) receptacles 40 that are externally accessible, optionally under a protective door or cover 42. The power receptacles 40 can be provided on a wall panel that is spaced apart from the wall panel 10w providing the window 11 or that is pivotably or removably attached to the enclosure 10e of the power pedestal. The wall panel 10w can be oriented to face a walkway to facilitate ease of access. However, the wall panel 10w can be oriented to face any desired in-use direction.

Figure 5C:
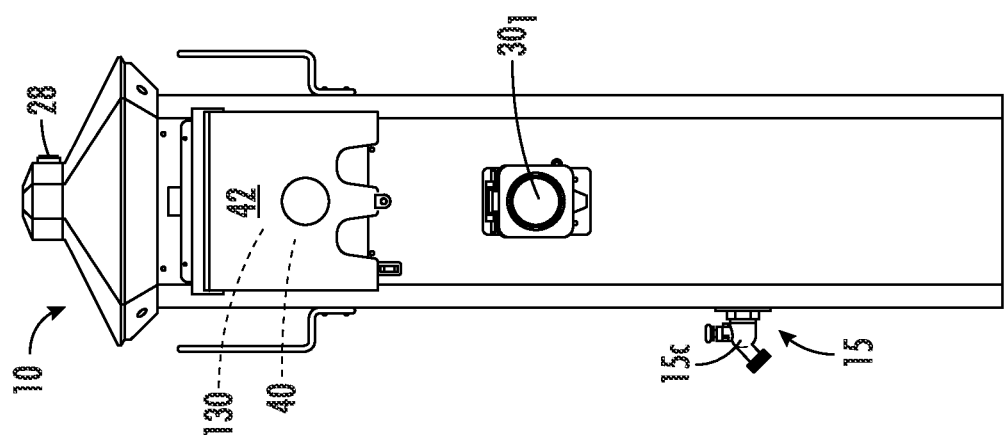
FIG. 5C is a side view of the power pedestal shown in FIG. 5A, according to embodiments of the present invention.
Figure 5B:
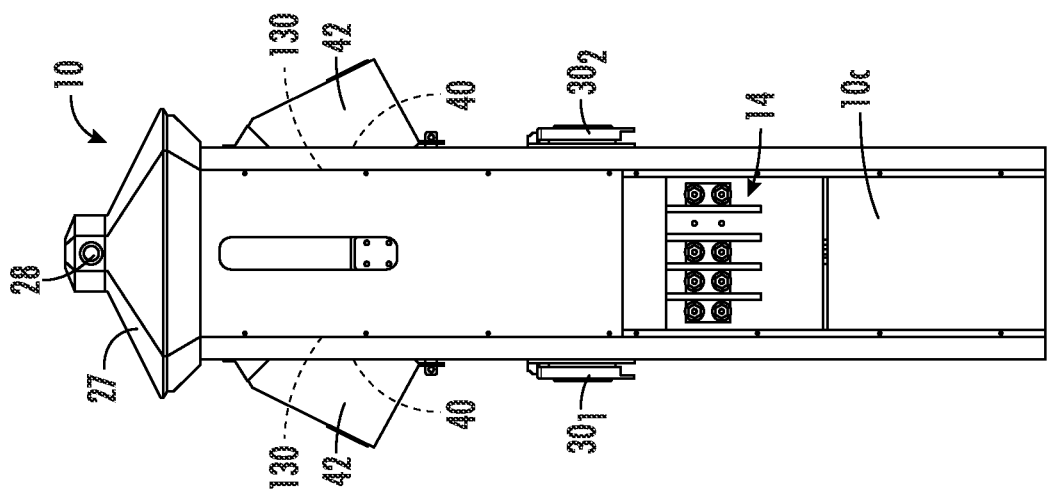
FIG. 5B is a front view of the power pedestal shown in FIG. 5A, shown with a wall panel removed according to embodiments of the present invention.
Figure 5A:
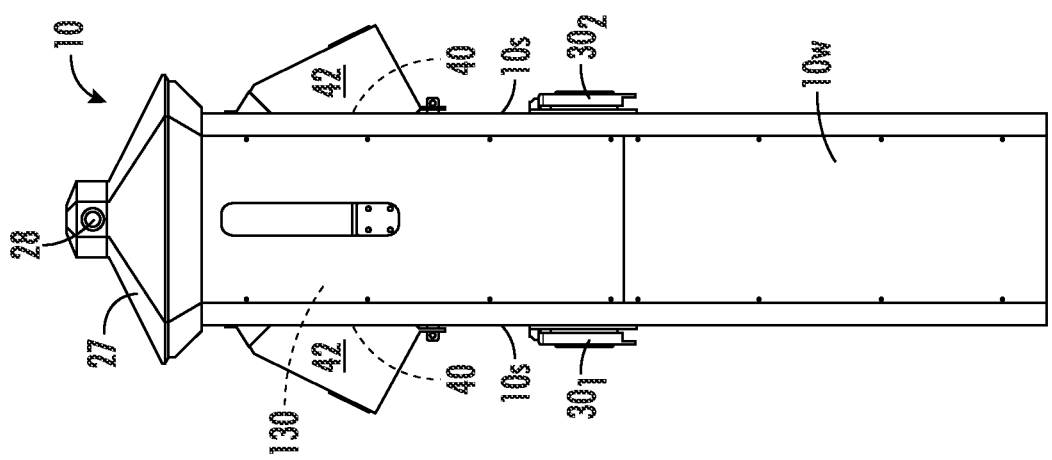
FIG. 5A is a front view of another embodiment of a power pedestal according to embodiments of the present invention.

Referring to FIGS. 5A-5C, the power pedestal 10 can include first and second primary circuit breakers $30_1$, $30_2$, that can be positioned on respective opposing sides $10s_1$, $10s_2$ of the enclosure 10e. The removable or detachable wall panel 10w (shown removed in FIG. 5B) can be on a side of the enclosure 10e that is between the opposing sides $10s_1$, $10s_2$. One primary circuit breaker $30_1$ or $30_2$, can be aligned under one door or cover 42 that can reside over one or more power outlet receptacle 40. A secondary or branch circuit breaker 130 can be coupled to each power outlet receptacle and one of the primary circuit breakers 30.

Referring to FIG. 5C, the power pedestal 10 can also include a water box 15. The water box 15 can provide a water supply line valve connection 15c.

Figure 5D:
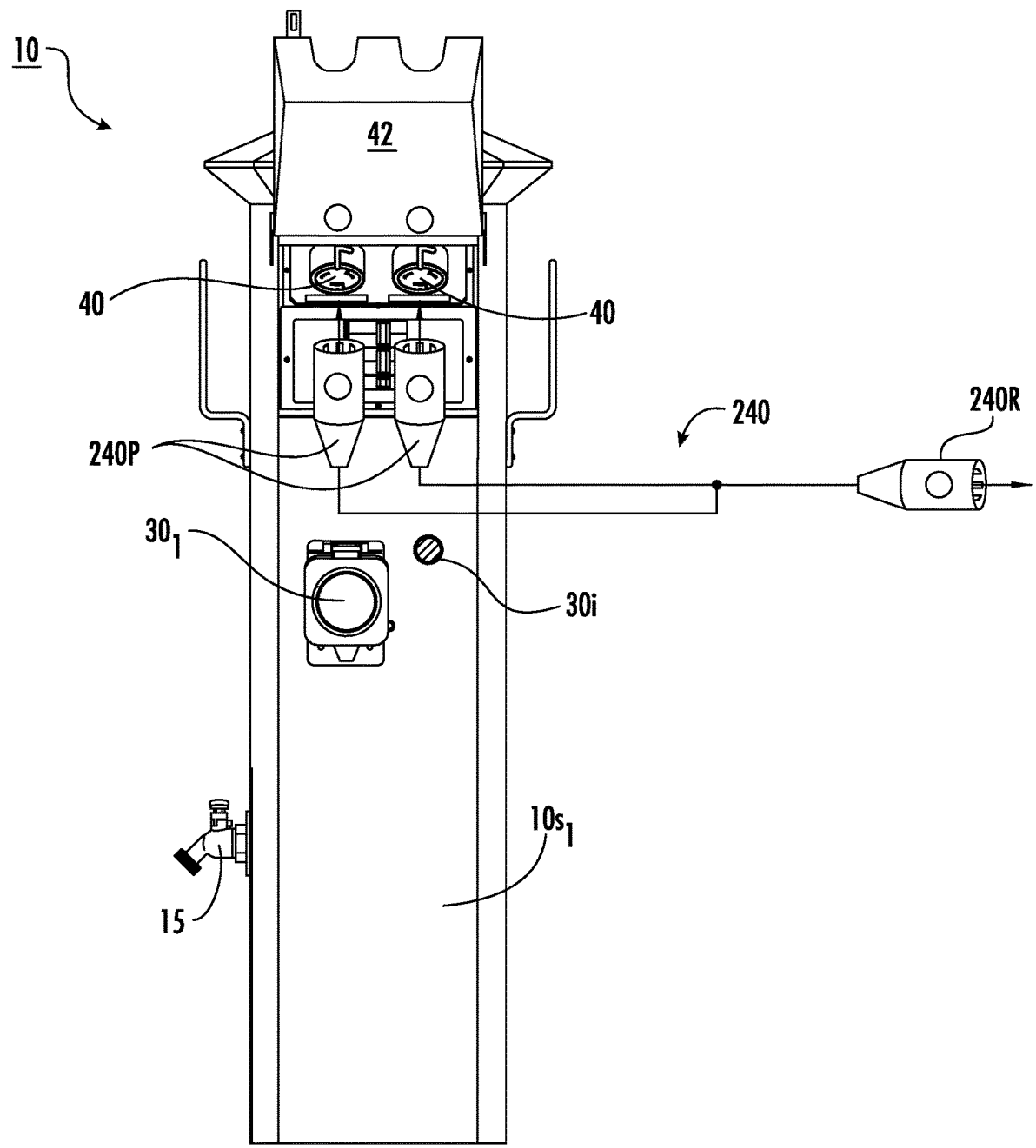
FIG. 5D is a side view of the power pedestal shown in FIG. 5A according to embodiments of the present invention.

Referring to FIG. 5D, the power pedestal 10 can be configured to connect to a reverse Y cable 240 with a first end comprising a fi first and second plugs 240P that connect to adjacent first and second receptacles 40 of the power pedestal 10 and the cable 240 has an opposing end comprising a vehicle/vessel receptacle 240R.

FIG. 5D also illustrates that the power pedestal 10 can include a ground fault status indicator and reset 30i on a respective side wall $10s_1$ adjacent the corresponding ground fault protected main breaker $30_1$.

Figure 6A:
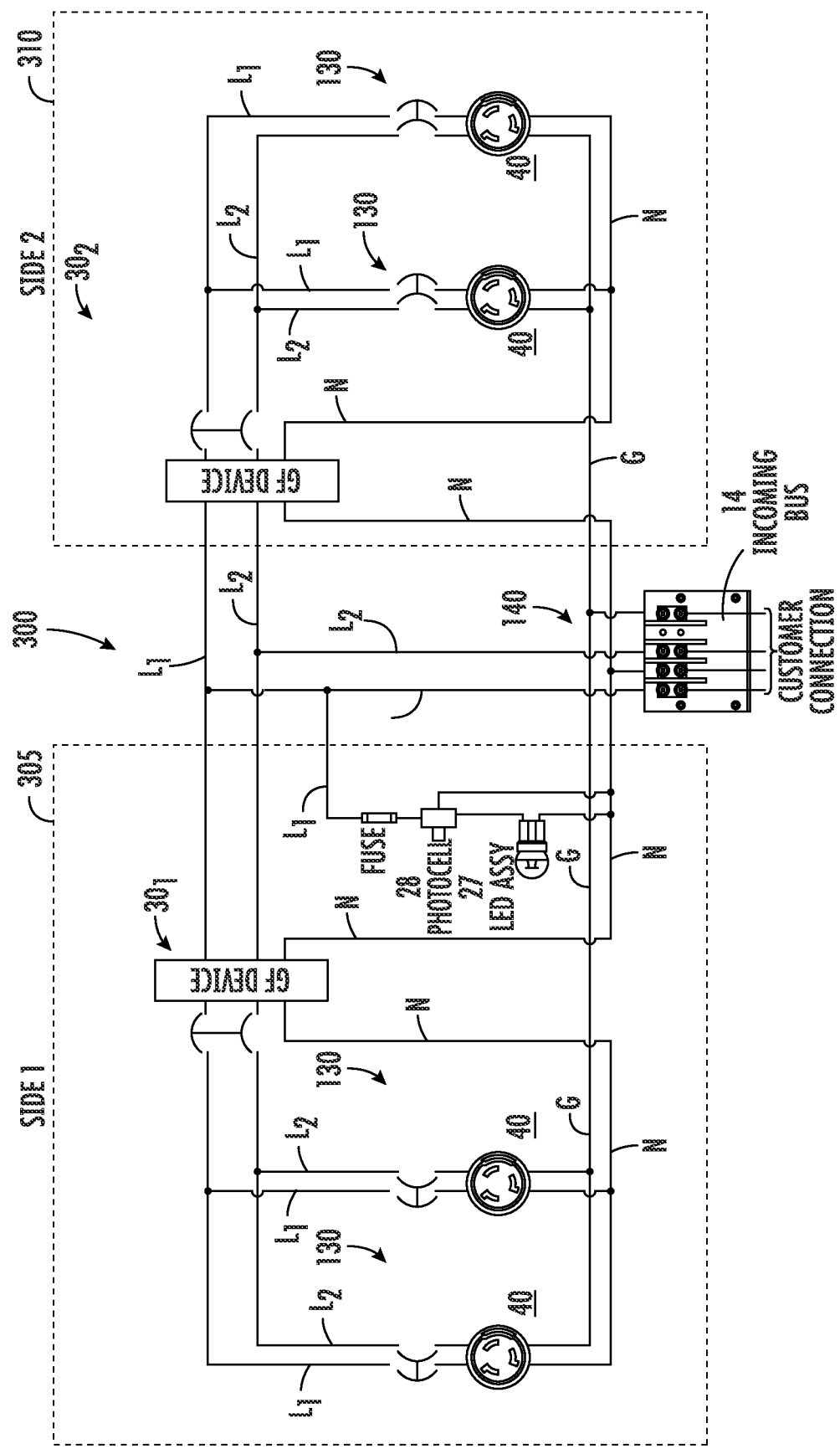
FIG. 6A is a schematic illustration of example ground fault circuitry of a power pedestal according to embodiments of the present invention.

FIG. 6A illustrates an example power circuit 300 of the power pedestal 10. The power circuit 300 is coupled to the incoming bus 14. The power circuit 300 can include a first side 305 with the first primary circuit breaker $30_1$ coupled to first and second branch circuit breakers 130. The power circuit 300 can include a second side 310 with the second primary circuit breaker $30_2$ coupled to first and second branch circuit breakers 130. Each branch circuit breaker 130 can be coupled to a respective power outlet receptacle 40. The first side 305 and the second side 310 are each electrically connected to electrical leads "L", including L1 (lead 1), L2 (lead 2), G (ground) and N (neutral) of the incoming bus 14. The lead inputs to the primary circuit breakers 301, 302 and power receptacles 40 can be provided by the internal bus 16 (FIG. 2).

One of the sides 305, 310, shown as the first side 305 of the power circuit 300, can also include a fuse 128, the photocell 28 and light source (LED assembly) 27 coupled to L1.

The power receptacles 40 can be marine grade, corrosion resistant receptacles. The power pedestal 10 is structured to provide electrical power to devices that are electrically connected to the power pedestal 10 via the output power receptacles 40.

The primary circuit breakers $30_1$, $30_2$ can be configured as two-phase, 30 mA ground fault protected devices. Other types/rated GFCIs can be used. The branch circuit breakers 130 can be configured as 50 A (amp) (e.g., 2P 50 A circuit breaker) devices. The power receptacles 40 can be configured as 50 A, 125/250V outlets. However, other amperage and voltage rated devices may be used.

For example, the power receptacles 40 can be provided with at least some having different current ratings than others, with corresponding different size receptacles, optionally with 30 A, 50 A and 100 A ratings.

Figure 6B:
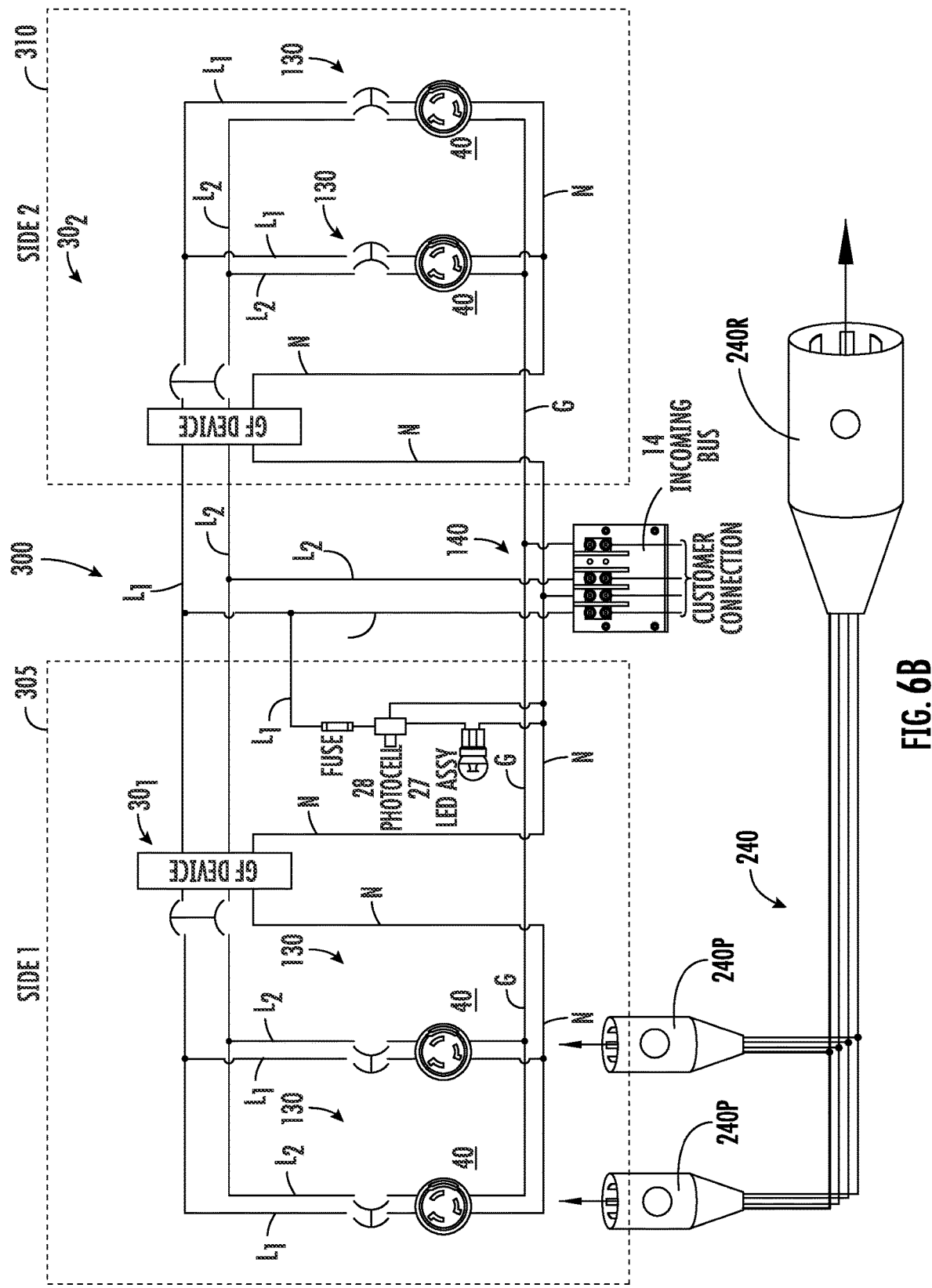
FIG. 6B is a schematic illustration of the example ground fault circuitry shown in FIG. 6A illustrated with a reverse Y adapter cable according to embodiments of the present invention.
Figure 13:
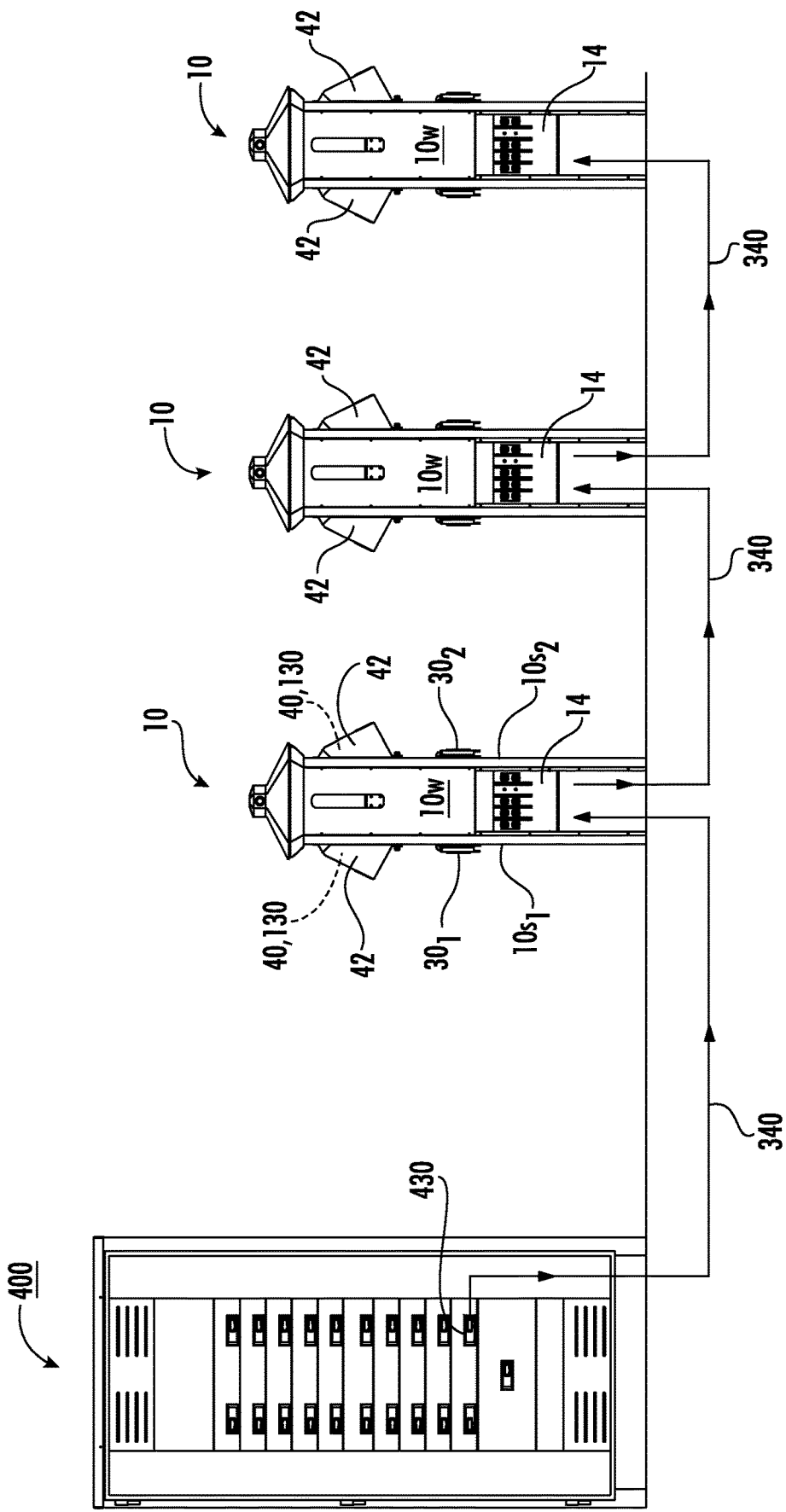
FIG. 13 is a schematic illustration of an example power pedestal loop feed bus according to embodiments of the present invention.

Individual per side ground fault mains $30_1$, $30_2$, allow for service of breakers 130 and receptacle 40 without interrupting power to adjacent in-use circuits and or users such as boaters. In turn, ground fault mains eliminate the need for individual ground fault breakers tied to each receptacle 40. Referring to FIG. 6B, this power circuit 300 can allow for use of reverse Y adapter cables 240 in the vessel to pedestal connection. Currently, reverse Y adapters do not function with ground fault breakers. Advantageously, this configuration also allows for serviceability of single side or whole pedestal without disconnecting power to a string of pedestals on a loop feed circuit (FIG. 13). This configuration can reduce overall cost of ownership by eliminating costly individual ground fault breakers per-shore power connection. Power pedestals are typically two sided and provide multiple shore power connections servicing two slips per single pedestal. Power pedestals 10 with integrated ground fault mains $30_1$, $30_2$ per side or per pedestal, can reduce overall internal wiring which in turn reduces potential failure points. In addition, ground fault mains $30_1$, $30_2$ allow for use of nonground fault individual breakers 130 to protect shore power receptacles 40 and still meet current applicable code requirements. Shore power breakers are commonly replaced as part of marina maintenance programs and the use of non-ground fault (branch) breakers 130 makes replacement of such breakers easier to perform and/or at a lower overall cost.

Figure 7:
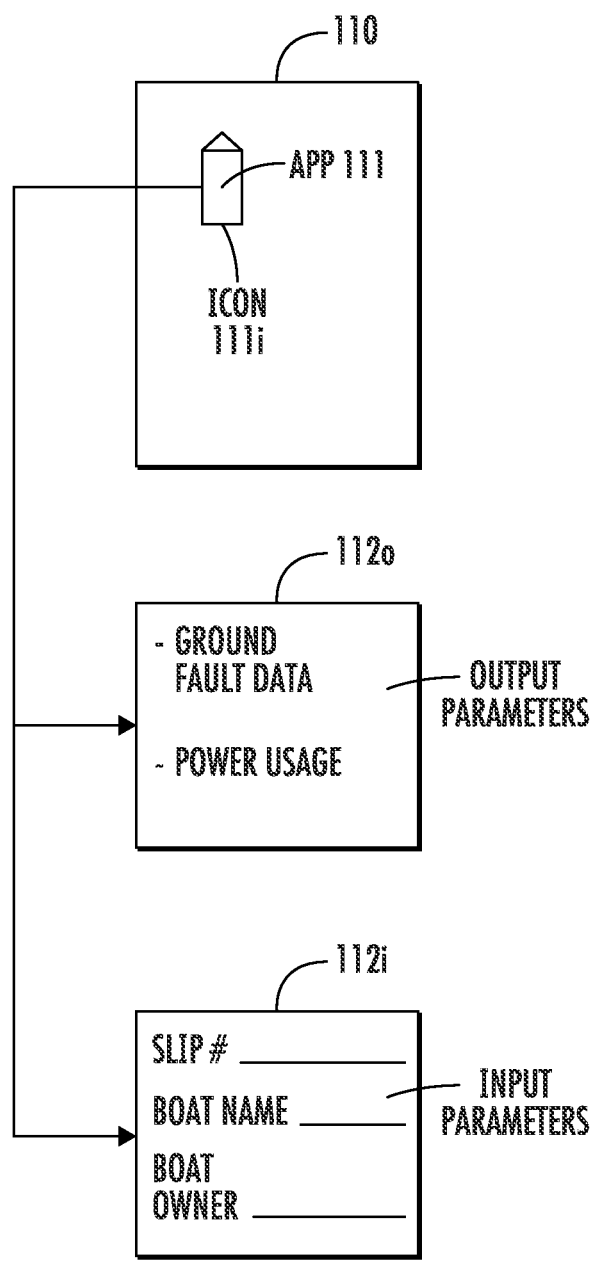
FIG. 7 is a schematic illustration of an example APP used for communicating with a power pedestal according to embodiments of the present invention.

Referring to FIG. 7, in some embodiments, a mobile device 110 of a user can wirelessly, such as via BLUETOOTH wireless technology, communicate with the power pedestal 10 using a power pedestal communication APP 111. The APP 111 can be defined or accessible by an icon 111$i$ on a display of the mobile device 110 and can comprise input pages 112$i$ and output pages 112$o$. The input pages 112$i$ can accept user specific information such as boat name, boat owner, slip number and the like. The input pages 112$i$ can also include reservation requests with slip size required or boat size to correlate with slip size. The output pages 112$o$ can provide ground fault data, power usage data and the like.

Figure 8:
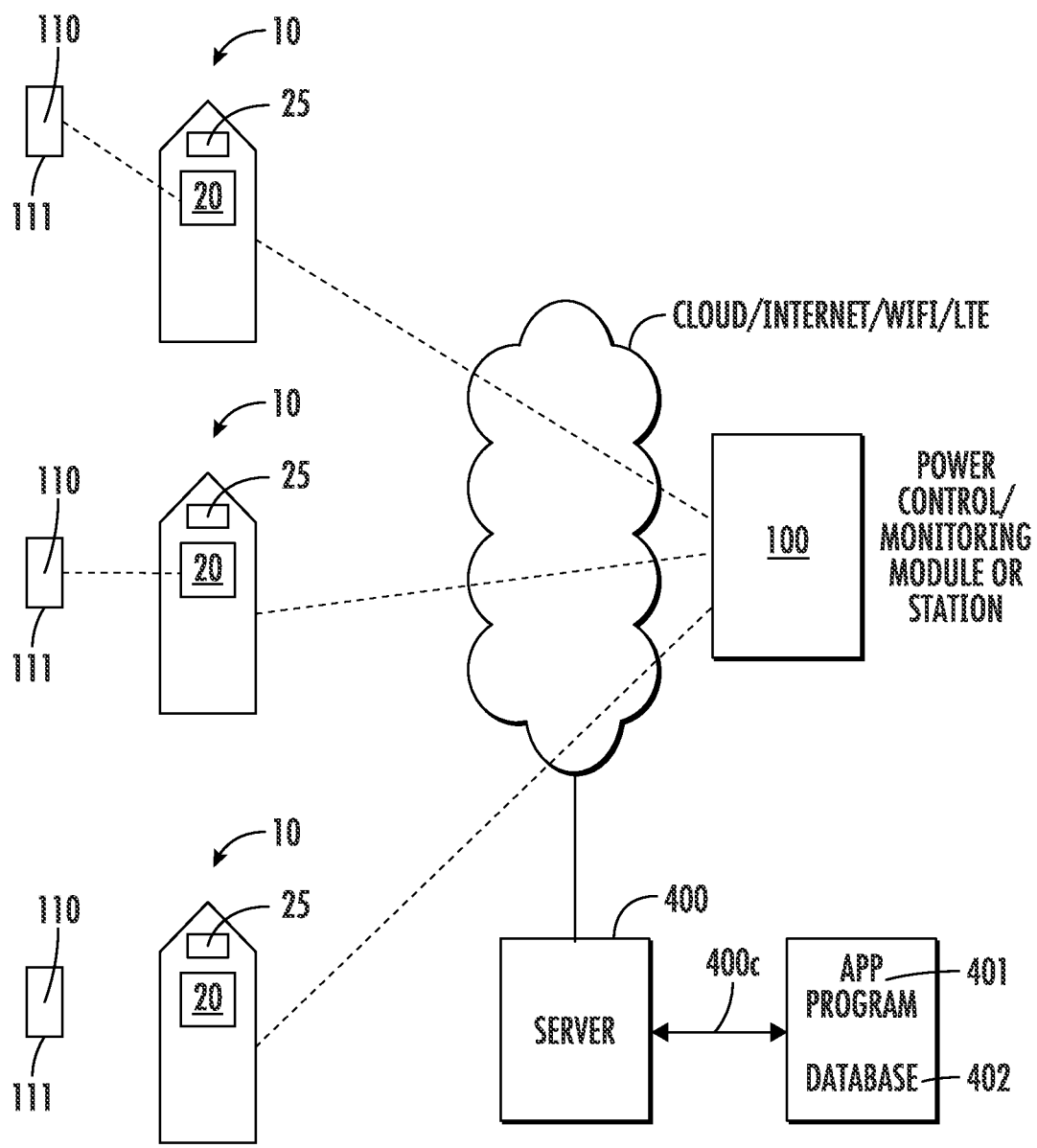
FIG. 8 is a schematic illustration of a power control and/or monitoring module or station that can communicate with multiple power pedestals according to embodiments of the present invention.

Referring to FIG. 8, a facility comprising a plurality of power pedestals 10, such as a marina or RV park, for example, can be configured with a power control/monitoring module or station 100 that can communicate with each power pedestal 10. The communication can be wireless communications over a local or global wireless network and may use the cloud. The power pedestal monitoring system 100 can be provided using a server 400. The server 400 may be embodied as a standalone server or may be contained as part of other computing infrastructures. The server 400 may be embodied as one or more enterprise, application, personal, pervasive and/or embedded computer systems that may be standalone or interconnected by a public and/or private, real and/or virtual, wired and/or wireless network including the Internet, and may include various types of tangible, non-transitory computer-readable media. The server 400 may also communicate with the network via wired or wireless connections, and may include various types of tangible, non-transitory computer-readable media. As is known to those of skill in the art, the server 400 can include or be in communication with a data processing circuit 400$c$. The data processing module or circuit 400$c$ can provides the APP software program 401 and/or power pedestal (PP) database(s) 402 for one or more facilities (e.g., marinas, RV parks) comprising the power pedestals 10. For example, for each facility, the server 400 can correlate slip/space numbers, sizes thereof, power pedestal identifier, status of the power pedestal and ground fault data and date availability for reservations/in-use information. The server 400 can also collect user information, payment information of users.

The dashboard 101 (FIG. 9) and/or server 400 can be provided using cloud computing which includes the provision of computational resources on demand via a computer network. The resources can be embodied as various infrastructure services (e.g., compute, storage, etc.) as well as applications, databases, file services, email, etc. In the traditional model of computing, both data and software are typically fully contained on the user's computer; in cloud computing, the user's computer may contain little software or data (perhaps an operating system and/or web browser) and may serve as little more than a display terminal for processes occurring on a network of external computers. A cloud computing service (or an aggregation of multiple cloud resources) may be generally referred to as the "cloud". Cloud storage may include a model of networked computer data storage where data is stored on multiple virtual servers, rather than being hosted on one or more dedicated servers.

Users can communicate with a respective display 20, the dashboard 101 and/or server 400 via a computer network, such as one or more of local area networks (LAN), wide area networks (WAN) and can include a private intranet and/or the public Internet (also known as the World Wide Web or "the web" or "the Internet."

Figure 9:
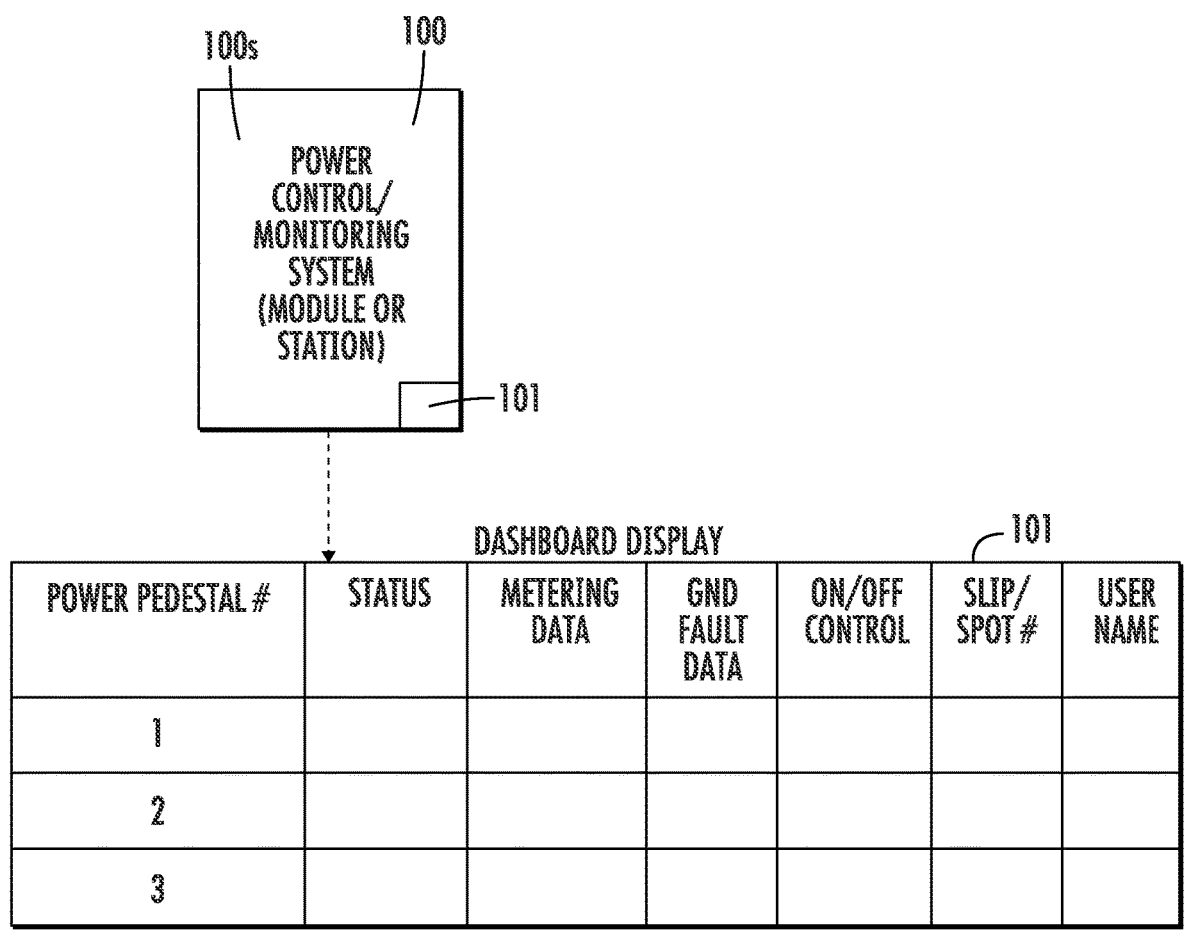
FIG. 9 is a schematic illustration of data of one or more power pedestals that can be provided to a dashboard and/or monitored and/or controlled by a power control monitoring module according to embodiments of the present invention.

FIG. 9 illustrates that the power control/monitoring system 100 such as a module and/or station 100 can comprise a dashboard display 101 of different power pedestals and corresponding data regarding same, including status, metering data, ground fault data, slip/spot number, current user at site, and ON/OFF power control for each.

Figure 10:
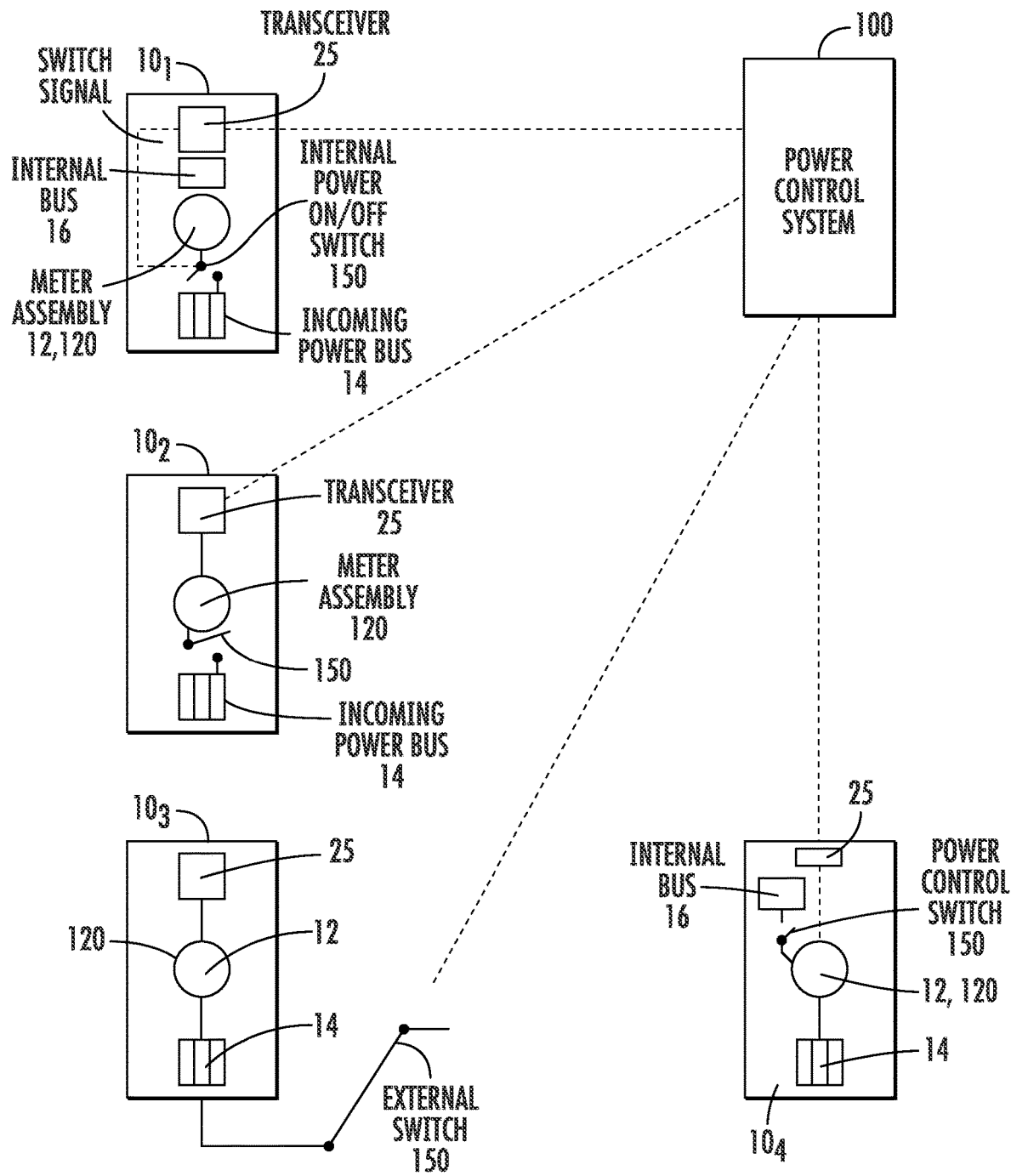
FIG. 10 is a schematic illustration of a power control system that can control power input to and/or output from one or more power pedestals according to embodiments of the present invention.

FIG. 10 illustrates that a respective power pedestal 10 can be in communication with a power control switch 150 that can be controlled by the power control system 100. The first two power pedestals $10_1$, $10_2$ illustrate an internal power control switch 150 that can be coupled to the incoming bus 14. The third power pedestal $10_3$ illustrates an external power control switch 150 that is coupled the incoming power bus 14. The fourth power pedestal $10_4$ illustrates that the internal power control switch 150 can be coupled to the internal power bus 16. Combinations of the different power control switches 150 may also be used.

Figure 11:
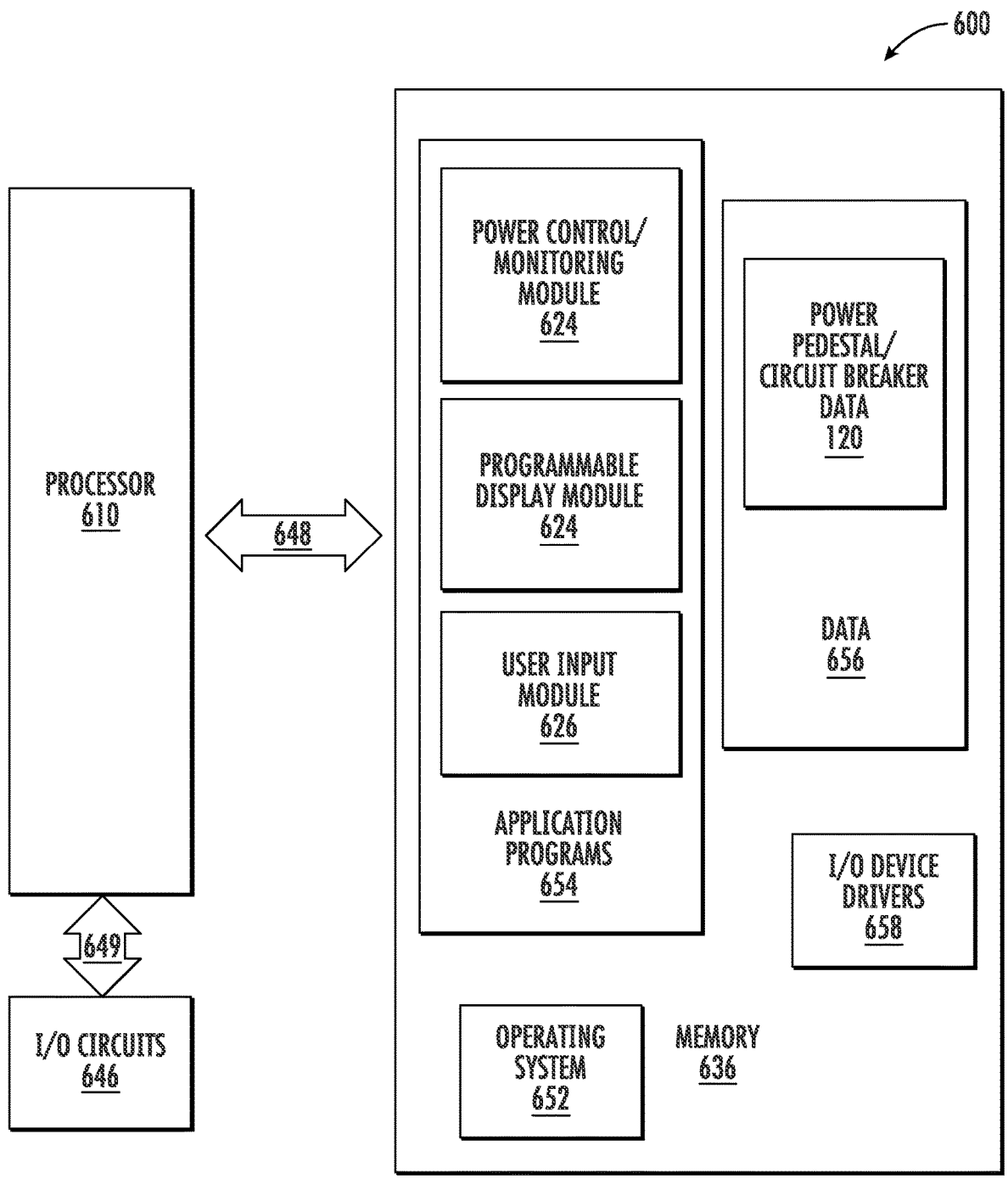
FIG. 11 is a schematic illustration of an example data processing system according to embodiments of the present invention.

Referring to FIG. 11, embodiments of the invention may be configured as a data processing system 600, which can include a (one or more) processors 610, a memory 636 and input/output circuits 646. The one or more processors 610 can be part of a server, router, mobile device, dashboard or power monitoring/control circuit.

The data processing system 600 may be incorporated in, for example, one or more device such as a smartphone or computer, database, dashboard, server, router, monitoring station or the like.

The data processing system 600 can reside on one machine or be distributed over a plurality of machines and/or in the "cloud".

The processor 610 communicates with the memory 636 via an address/data bus 648 and communicates with the input/output circuits 646 via an address/data bus 649. The input/output circuits 146 can be used to transfer information between the memory (memory and/or storage media) 636 and another computer system or a network using, for example, an Internet protocol (IP) connection. These components may be conventional components such as those used in many conventional data processing systems, which may be configured to operate as described herein.

In particular, the processor 610 can be commercially available or custom microprocessor, microcontroller, digital signal processor or the like. The memory 636 may include any memory devices and/or storage media containing the software and data used to implement the functionality circuits or modules used in accordance with embodiments of the present invention. The memory 636 can include, but is not limited to, the following types of devices: ROM, PROM, EPROM, EEPROM, flash memory, SRAM, DRAM and magnetic disk. In some embodiments of the present invention, the memory 636 may be a content addressable memory (CAM).

As further illustrated in FIG. 11, the memory (and/or storage media) 636 may include several categories of software and data used in the data processing system: an operating system 652; application programs 654; input/output device drivers 658; and data 656. As will be appreciated by those of skill in the art, the operating system 652 may be any operating system suitable for use with a data processing system, such as IBM®, OS/2®, AIX® or zOS® operating systems or Microsoft® Windows®10 or WindowsXP operating systems, FreeRTOS operating system, Unix or Linux™, IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 658 typically include software routines accessed through the operating system 652 by the application programs 654 to communicate with devices such as the input/output circuits 646 and certain memory 636 components. The application programs 654 are illustrative of the programs that implement the various features of the circuits, method steps discussed above and/or modules according to some embodiments of the present invention. Finally, the data 656 represents the static and dynamic data used by the application programs 654 the operating system 652 the input/output device drivers 658 and other software programs that may reside in the memory 636.

The data 656 may include (archived or stored) digital data sets correlated to respective power pedestals.

As further illustrated in FIG. 11, according to some embodiments of the present invention, the application programs 654 include a power control or power monitoring or power control and power monitoring module 624, a programmable display module 625 and/or a user input module 626. The user input module 626 can communicate with or provide the power pedestal APP 111. The application program 654 may be located in a local server (or processor) and/or database or a remote server (or processor) and/or database, or combinations of local and remote databases and/or servers.

While the present invention is illustrated with reference to the application programs 654, and modules 624, 625 and 626 in FIG. 11, as will be appreciated by those of skill in the art, other configurations fall within the scope of the present invention. For example, rather than being application programs 654 these circuits and modules may also be incorporated into the operating system 652 or other such logical division of the data processing system. Furthermore, while the application programs 624, 625, 626 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 11 but may be provided by other arrangements and/or divisions of functions between data processing systems. For example, although FIG. 11 is illustrated as having various modules, one or more of these modules may be combined or separated without departing from the scope of the present invention.

Figure 12:
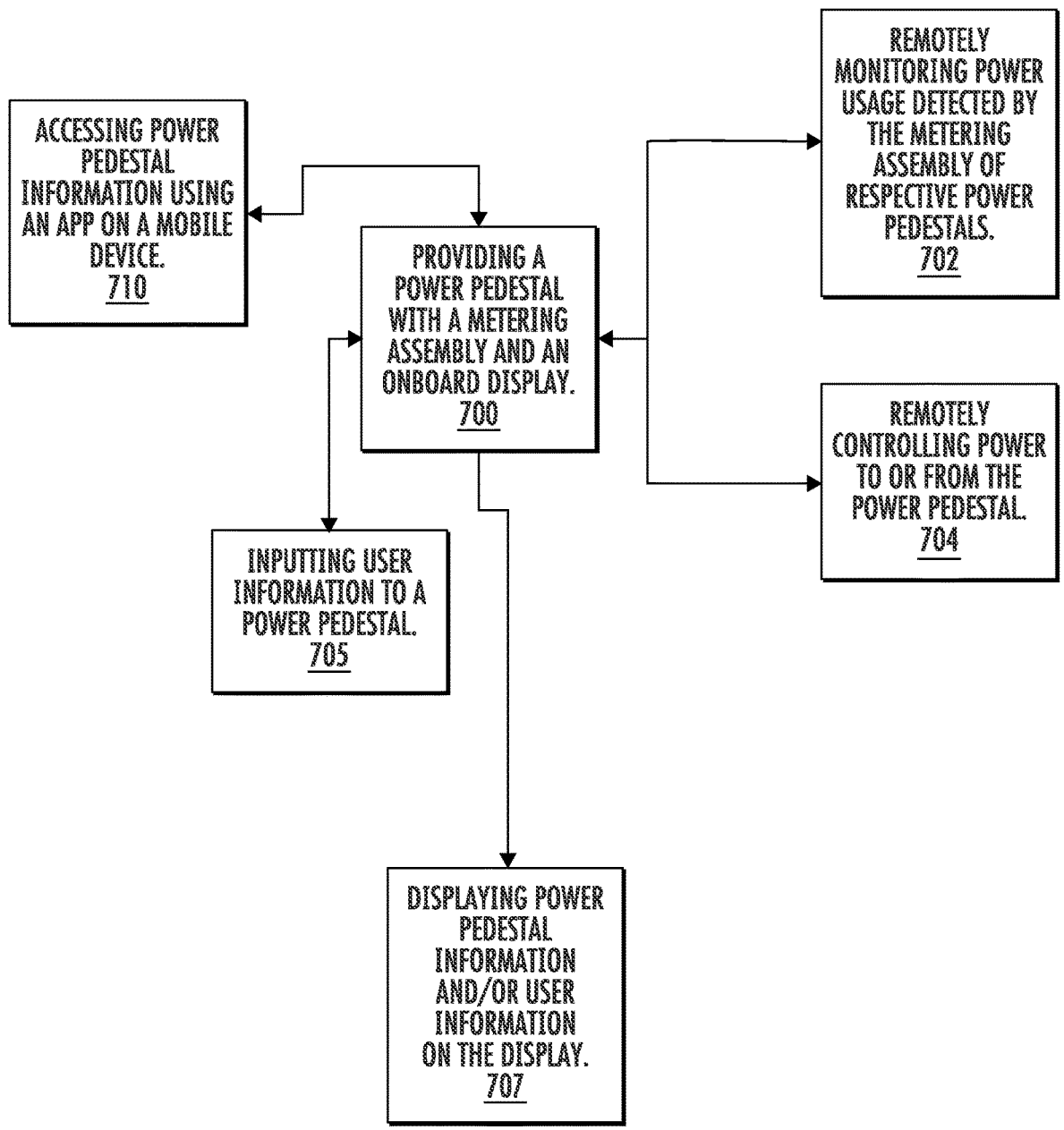
FIG. 12 is a flow chart of actions that can be carried out for communicating with power pedestals according to embodiments of the present invention.

Turning now to FIG. 12, an example method of operating a power pedestal is shown. A power pedestal with a metering assembly and an onboard display is provided (block 700). Power usage detected by the metering assembly of respective power pedestals is remotely monitored (block 702). Power to or from the power pedestal is remotely controlled (block 704). User information input to a power pedestal is accepted (block 705). Power pedestal information and/or user information is displayed on the display (block 707). Power pedestal information is accessed using an APP on a mobile device (block 710).

Referring now to FIG. 13, an example power pedestal feed bus is shown. The power pedestal feed bus comprises a distribution cabinet 400 with a distribution panel comprising feeder breakers 430. A single feeder breaker 430 can provide power to a plurality of power pedestals 10 via feeder cable 340 on a pedestal loop feed bus. As shown, a feeder cable 340 is connected to the feeder breaker 430 and to the incoming bus 14 of respective power pedestals on the loop feed bus. The per side main breaker $30_1$, $30_2$, provides an electrical disconnect of a respective side or the entire corresponding power pedestal allowing for maintenance of shore power receptacles 40 and branch circuit breakers 130 while maintaining power to subsequent/other power pedestals 10 on the same/single feeder 430 of the loop feed bus. To be clear, the term "loop" when used with the loop feed bus means a feed bus that connects a plurality of power pedestals to a main power source (power distribution panel), like a "daisy chain" without requiring the "loop" to be "closed" back to the source power supply. There is no closing of the loop needed as electrical loop is already closed through the wiring that is looped or daisy chained to each pedestal.

Embodiments of the present invention may take the form of an entirely software embodiment or an embodiment combining software and hardware aspects, all generally referred to herein as a "circuit" or "module." Furthermore, the present invention may take the form of a computer program product on a (non-transient) computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one computer (e.g., a workstation, circuit breaker, mobile device), partly on one computer, as a stand-alone software package, partly on the workstation's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A power pedestal, comprising:
a housing comprising a first sidewall with externally accessible first and second power outlet receptacles and a second sidewall with externally accessible third and fourth power outlet receptacles; and
a power circuit in the housing coupled to an incoming bus, wherein the power circuit comprises a first ground fault circuit breaker coupled to first and second branch circuit breakers and a second ground fault circuit breaker coupled to third and fourth branch circuit breakers,
wherein the first and second branch circuit breakers are coupled to the first and second power outlet receptacles, respectively, and the third and fourth branch circuit breakers are coupled to the third and fourth power outlet receptacles, respectively, and wherein the first, second, third and fourth branch circuit breakers are non-ground fault circuit breakers whereby the first, second, third, and fourth power outlet receptacles are free of connections to respective individual ground fault breakers.

2. The power pedestal of claim 1, wherein the power circuit comprises a first side and a second side that are each electrically connected to a first lead, a second lead, electrical ground and electrical neutral of the incoming bus, wherein the first side comprises the first ground fault circuit breaker and the first and second branch circuit breakers and the second side comprises the second ground fault circuit breaker and the third and fourth branch circuit breakers.

3. The power pedestal of claim 2, wherein only one of the first side or the second side of the power circuit further comprises a photocell and a light source coupled to the first lead.

4. The power pedestal of claim 3, wherein the only one of the first side or the second side of the power circuit with the photocell and the light source further comprises a fuse coupled to the first lead and the photocell.

5. The power pedestal of claim 2, in combination with a power distribution cabinet comprising a feeder breaker connected to the power pedestal and to a plurality of additional power pedestals defining a power pedestal loop feed bus, wherein the power circuit of each power pedestal is configured to provide an electrical disconnect from the loop feed bus allowing for serviceability of the first side or the second side of the power circuit or an entirety of the power pedestal without disconnecting power to a string of pedestals on the loop feed bus.

6. The power pedestal of claim 1, wherein the first, second, third and fourth power outlet receptacles are marine grade, corrosion resistant receptacles.

7. The power pedestal of claim 1, wherein the first and second ground fault circuit breakers are two-phase, 30 mA ground fault protected devices.

8. The power pedestal of claim 1, wherein the first, second, third and fourth branch circuit breakers are two phase, 50 A (amp) devices.

9. The power pedestal of claim 1, wherein the first, second, third and fourth power outlet receptacles are 50 A, 125/250V power outlet receptacles.

10. The power pedestal of claim 1, wherein the first, second power outlet receptacles are configured to connect to first and second plugs of a reverse Y adapter in a vessel to power pedestal connection.

11. The power pedestal of claim 1, further comprising an internal bus electrically connected to the incoming bus and to the first, second, third and fourth power outlet receptacles providing the power circuit.

12. The power pedestal of claim 11, wherein the internal bus resides inside the housing above the incoming bus.

13. The power pedestal of claim 1, further comprising a water supply connection coupled to the housing.

14. The power pedestal of claim 1, wherein the housing comprises a third sidewall connecting the first and second sidewalls, and wherein the third sidewall comprises a removable panel or a pivotable panel, optionally wherein the third sidewall comprises a visually transmissive window.

15. The power pedestal of claim 1, further comprising a first ground fault indicator and reset and externally accessible and adjacent the first ground fault circuit breaker on the first sidewall and a second ground fault indicator and reset externally accessible and adjacent the second ground fault circuit breaker on the second sidewall.

16. A method of providing ground fault protection to power pedestals, comprising, comprising:
providing a plurality of power pedestals, each with a power circuit in a power pedestal housing and coupled to an incoming bus, wherein the power circuit comprises a first ground fault circuit breaker coupled to first and second branch circuit breakers and a second ground fault circuit breaker coupled to third and fourth branch circuit breakers, wherein the first and second branch circuit breakers are coupled to first and second power outlet receptacles, respectively, and the third and fourth branch circuit breakers are coupled to third and fourth power outlet receptacles, respectively, and wherein the first, second, third and fourth branch circuit breakers are non-ground fault circuit breakers thereby eliminating individual ground fault breakers tied to each power outlet receptacle;
electrically disconnecting the first ground fault circuit breaker from the power circuit and while keeping the second ground fault circuit breaker operational and with the power circuit providing power to the third and fourth power outlet receptacles but not the first and second power outlet receptacles; and
servicing power circuit components of the power pedestal while the third and fourth power outlet receptacles are supplying power and the first and second power outlet receptacles are not supplying power without requiring a power down of an entirety of the power circuit.

17. The method of claim 16, wherein the power circuit comprises a first side and a second side that are each electrically connected to a first lead, a second lead, electrical ground and electrical neutral of the incoming bus, wherein the first side comprises the first ground fault circuit breaker and the first and second branch circuit breakers and the second side comprises the second ground fault circuit breaker and the third and fourth branch circuit breakers.

18. The method of claim 17, wherein only one of the first side or the second side of the power circuit further comprises a photocell and a light source coupled to the first lead, the method further comprising detecting environmental lighting conditions using the photocell and illuminating the power pedestal using the light source.

19. The method of claim 17, wherein the power pedestal is one of a plurality of power pedestals connected to a common feeder breaker of a power distribution cabinet and defining a power pedestal loop feed bus, wherein the method further comprises allowing each power pedestal to provide an electrical disconnect from the loop feed bus allowing for serviceability of the first side or the second side of the power circuit or an entirety of the power pedestal without disconnecting power to a string of pedestals on the loop feed bus thereby allowing for serviceability of the first side or the second side of the power circuit or the entire power pedestal without disconnecting power to a string of the plurality of power pedestals on a loop feed circuit.

20. The method of claim 16, wherein the first, second, third and fourth power outlet receptacles are marine grade, corrosion resistant receptacles.

21. The method of claim 16, further comprising connecting a reverse Y adapter cable from a vessel to a power pedestal of the plurality of power pedestals for shore power.

* * * * *